Oct. 15, 1940.  F. ROKOL  2,218,360
MARKET BASKET
Filed Jan. 18, 1938  5 Sheets-Sheet 1
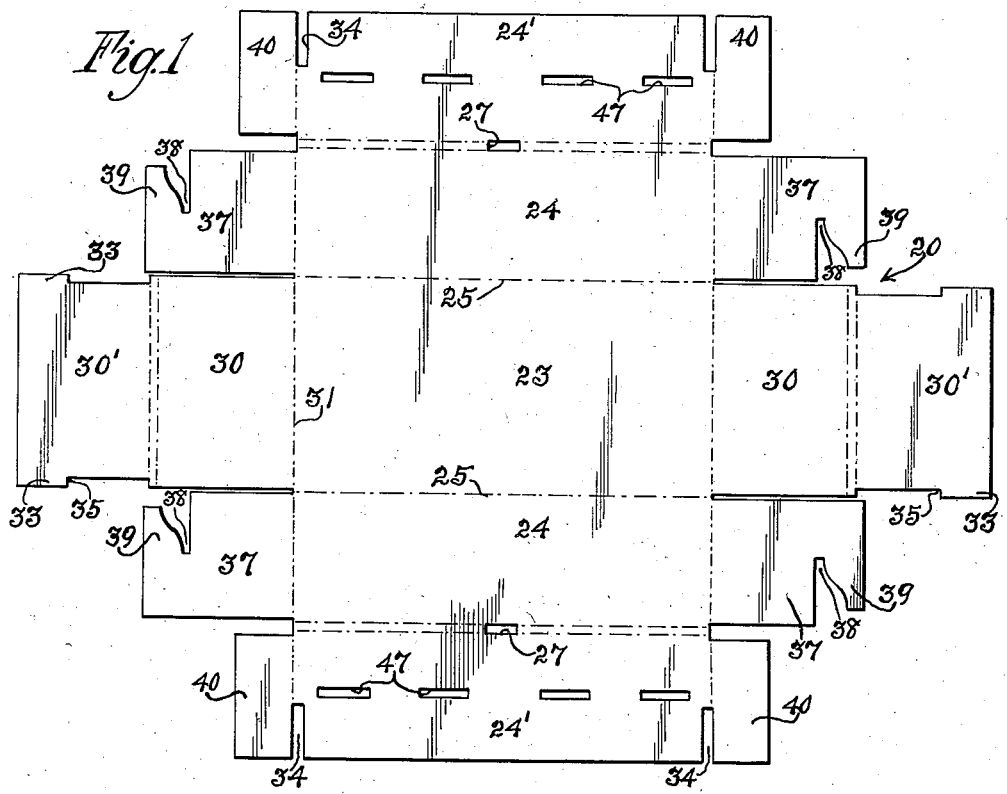
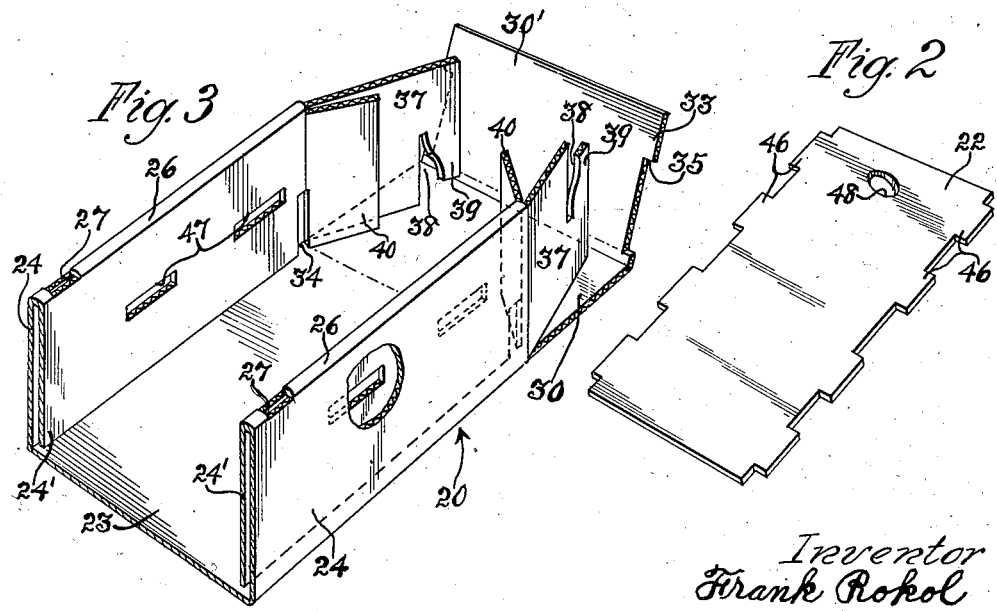
Inventor
Frank Rokol
by J. Daniel Stuwe
Attorney.

Oct. 15, 1940.     F. ROKOL     2,218,360
MARKET BASKET
Filed Jan. 18, 1938     5 Sheets-Sheet 2
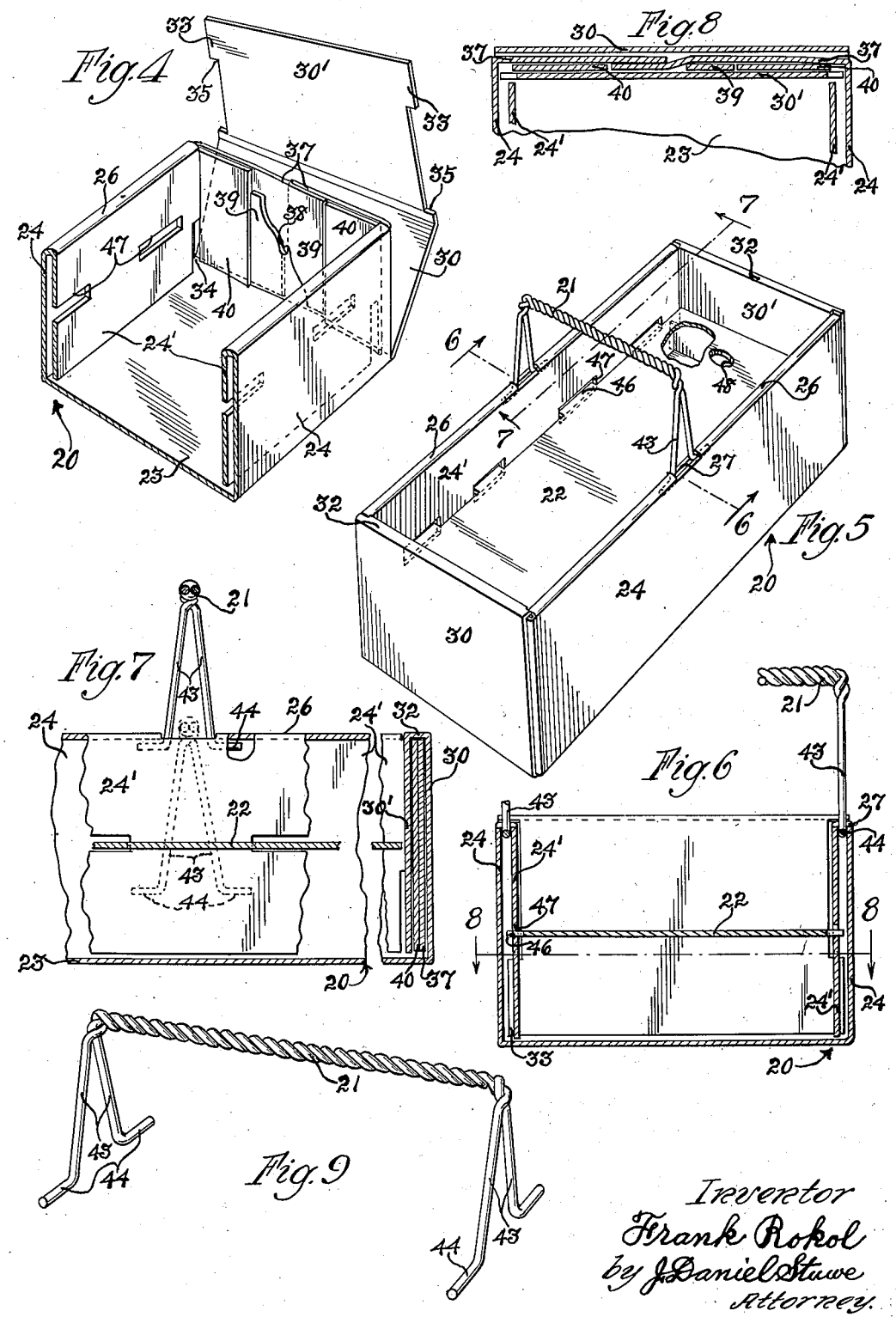
Inventor
Frank Rokol
by J. Daniel Stuwe
Attorney.

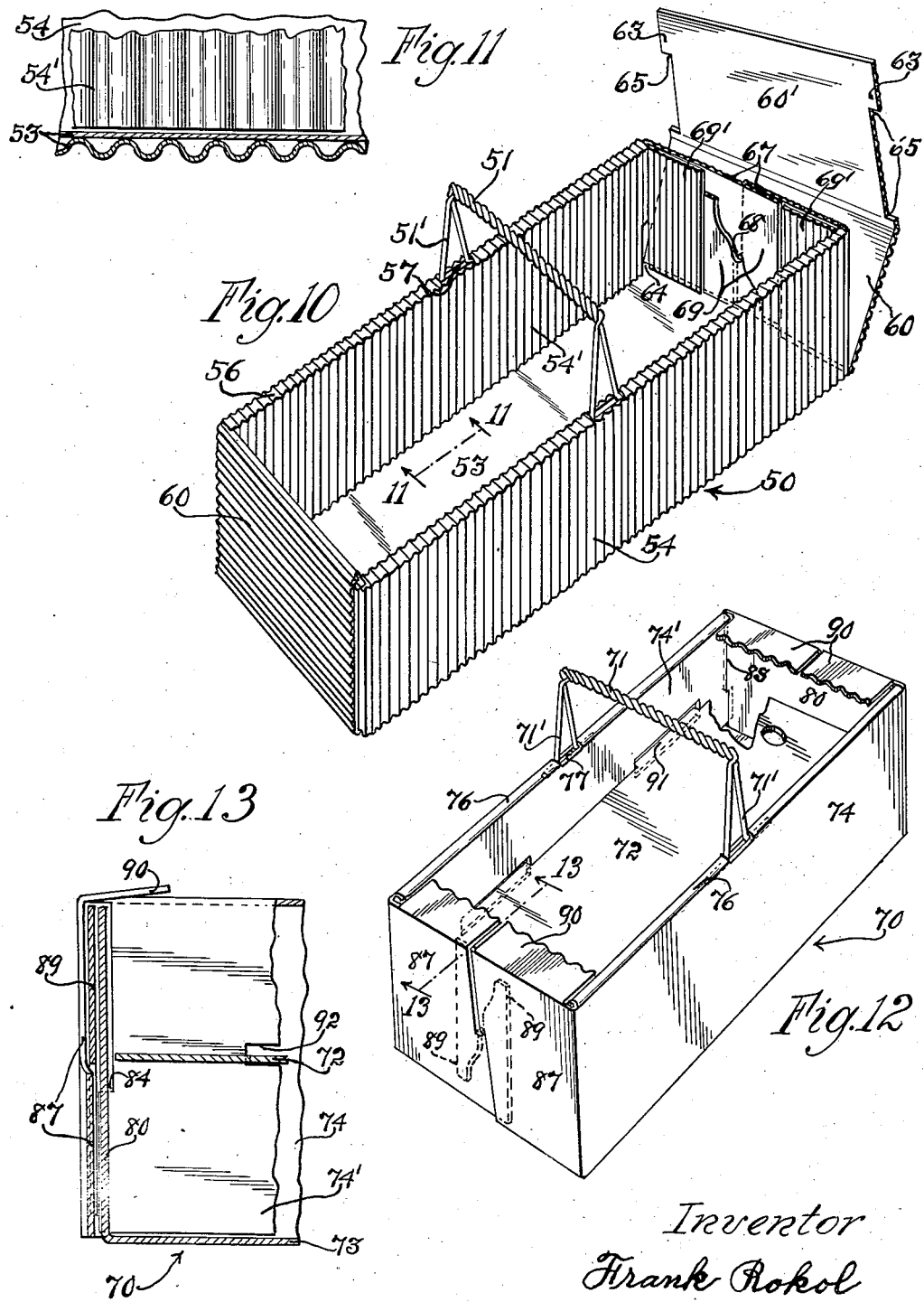

Oct. 15, 1940.  F. ROKOL  2,218,360
MARKET BASKET
Filed Jan. 18, 1938  5 Sheets-Sheet 4
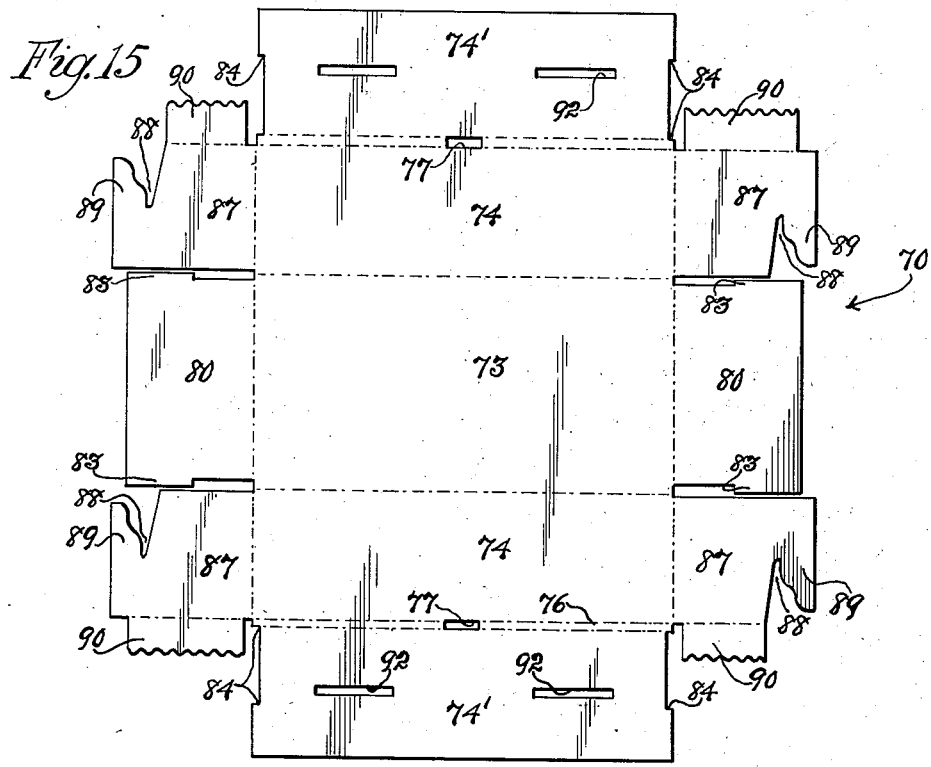
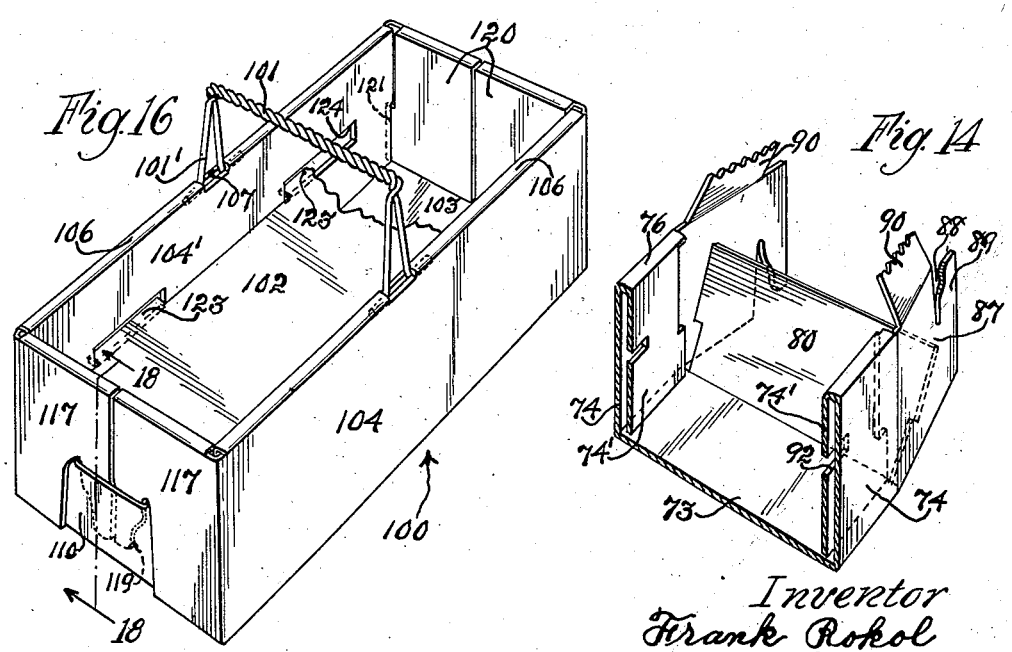
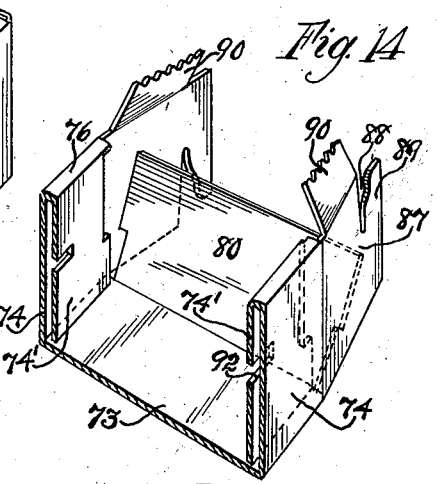
Inventor
Frank Rokol
by J Daniel Stuwe
Attorney.

Oct. 15, 1940.　　　　F. ROKOL　　　　2,218,360
MARKET BASKET
Filed Jan. 18, 1938　　　　5 Sheets-Sheet 5
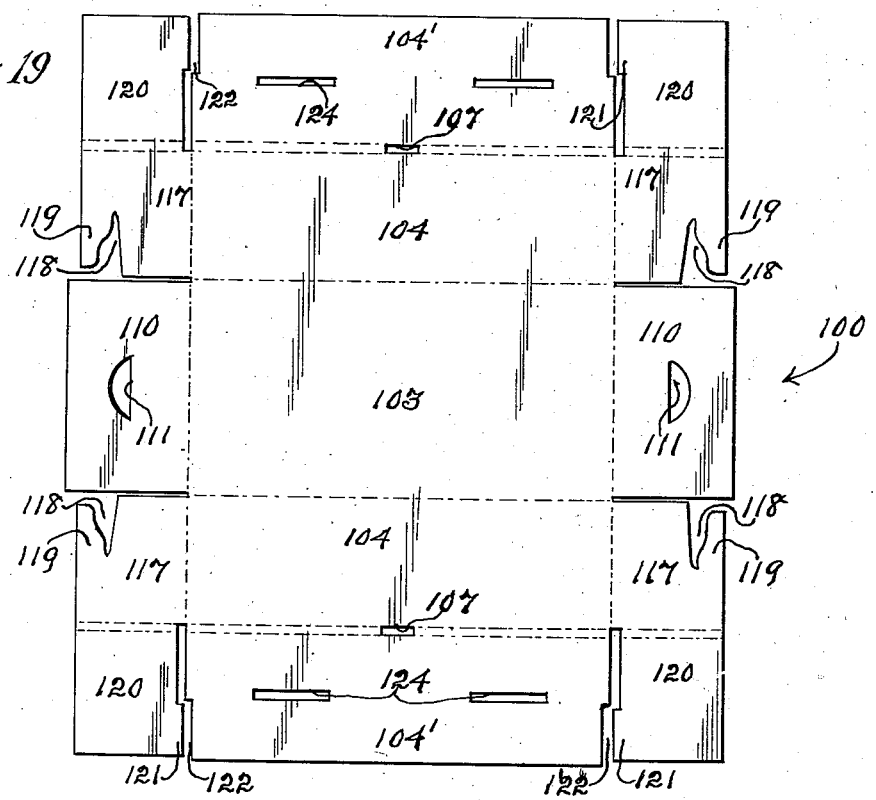
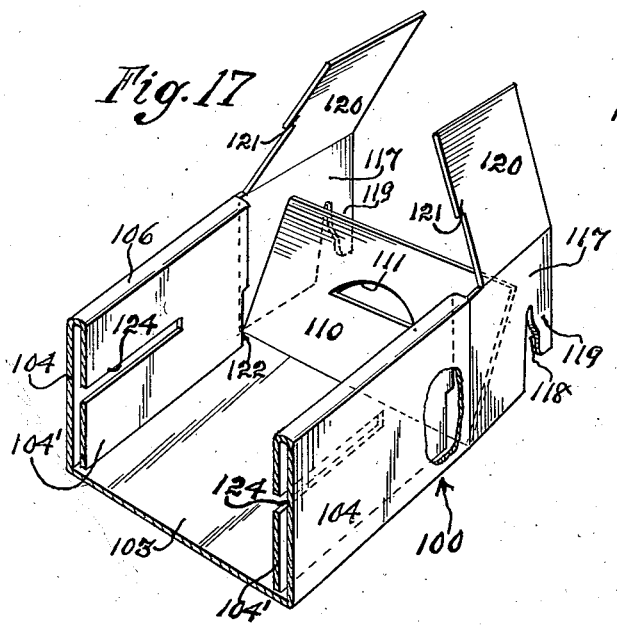
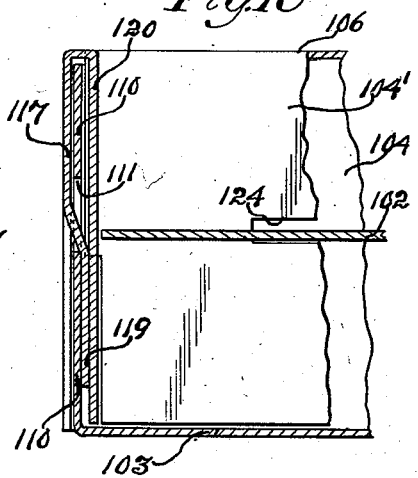
Inventor
Frank Rokol
by J. Daniel Stuwe
Attorney.

Patented Oct. 15, 1940

2,218,360

UNITED STATES PATENT OFFICE 2,218,360

MARKET BASKET

Frank Rokol, Chicago, Ill.

Application January 18, 1938, Serial No. 185,568

6 Claims. (Cl. 229—34)

This invention relates to improvements in market baskets, and this application is in part a continuation of my prior application for Market basket, Serial No. 162,660, filed September 7, 1937.

One of the main objects of this invention is to provide a secure and efficient market basket of foldable material, such as corrugated paper, of single face and double face or multiple face material, fiber board, and the like, wherein the foldable parts of the body include compound interlocking features which hold said parts securely in their set-up position, without any need of cleats, staples, or any other separate securing means; which basket is provided with a handle that is easily attached to and detached from the basket body, and the handle can be readily pressed down onto the basket, so that the baskets may be stacked upon each other; and which basket is provided with concealed partition means to separate and protect the different layers of fruits and vegetables, said partition means being readily insertable in and removable from the basket body.

Another object of this invention is to provide a basket of foldable material which has its foldable parts doubly secured and interlocked by its own interlocking means, without need of any separate locking elements, so that the foldable parts are positively held together and will not draw apart altho the basket is heavily loaded.

Another object is to provide a strong basket of this type which includes double side and end walls, thereby providing double strength, and also providing a neat exterior, and a smooth and even interior to avoid bruising the fruits and vegetables therein.

A more particular object of this invention is to provide such a double walled basket wherein the handle is readily attachable and detachable, and normally extends above the basket to be readily grasped; but is arranged to be readily depressible between the double walls, to bring the upper part of the handle substantially flush with the basket body, so that the baskets can be stacked one upon the other.

Another particular object of this invention is to provide a double walled basket comprising partition means positioned between the layers of fruits and vegetables, to prevent bruising or injuring them and especially protect the lower layer, and which is readily inserted in or removed from the basket and yet is not observable from the outside thereof.

These and various other objects and advantages are attained with this invention, as will become apparent from the following description, taken in connection with the accompanying drawings wherein the invention is shown in some of its preferred forms; it being understood that various other arrangements and forms of construction may be adopted in carrying out the objects and purposes of this invention.

In the drawings:

Fig. 1 is a plan view of the blank of foldable material from which the basket is made in its preferred form, the lines of fold being indicated in dot and dash lines.

Fig. 2 is a perspective view of the partition used therein.

Fig. 3 is a perspective view of an end portion of this form of basket, showing an early stage of the folding operation before either one of the double locking means is in the locked position.

Fig. 4 is a similar perspective view, but showing the inner locking means in the locked position.

Fig. 5 is a perspective view of the complete market basket made according to this form of the invention.

Figs. 6 and 7 are enlarged vertical sectional views, taken respectively on lines 6—6 and 7—7 of Fig. 5.

Fig. 8 is a partial horizontal sectional view, taken on line 8—8 of Fig. 6.

Fig. 9 is a perspective view of the handle for this basket.

Fig. 10 is a perspective view of the same form of basket, but constructed from single face corrugated fiber board instead of double face material.

Fig. 11 is an enlarged detail sectional view, taken on line 11—11 of Fig. 10.

Fig. 12 is a perspective view of the basket having its end members arranged in a slightly modified form.

Fig. 13 is an enlarged vertical sectional view thru the end part of this form, taken on line 13—13 of Fig. 12.

Fig. 14 is a perspective view of an end part of this form of basket, at an early stage of the end folding operation.

Fig. 15 is a plan view of the blank of material from which the basket with this form of end means is made.

Fig. 16 is a perspective view of the basket showing another modified form of end means.

Fig. 17 is a perspective view of an end part of this form, at an early stage of the end folding operation.

Fig. 18 is an enlarged vertical sectional view thru the end part of this form, taken on line 18—18 of Fig. 16.

Fig. 19 is a plan view of the blank of material from which the basket with this form of end means is made.

The drawings illustrate this improved market basket in a few of its most desirable arrangements and forms of construction, showing the same adapted to be provided in single face as well as in multiple face corrugated material, and indicating a few of its various forms of double interlocking means between the wall sections. In either arrangement or form the side walls are of double material, and the end walls also contain double material and double interlocking means, providing a strong and securely formed basket; and the handle is readily depressible thereon to facilitate stacking the baskets on each other.

In the form shown in Figs. 1 to 8 inclusive, this improved market basket comprises a basket body 20 formed of a single blank of foldable material, which is readily set up to provide a strong basket and is readily collapsible; also a handle 21 which extends above the body and is arranged to be readily attachable and detachable, and can also be depressed onto the body, so that the baskets may be stacked one upon the other when filled; and a partition 22 is provided which is readily insertable and removable, being adapted to prevent bruising and injuring the contents, especially the lower layer, of tomatoes, peaches, or other fruits and vegetables, said partition being fully concealed by the basket walls. These three parts are detachably combined to provide a strong market basket, without the use of any separate securing elements, and also to provide a neat exterior, and a smooth and even interior to avoid injuring the contents.

The basket body 20 consists of a single blank of foldable material, such as corrugated paper, which may be of single face or of multiple face corrugated material, also of heavy fiber board, and the like, and comprises the bottom 23 from which the outer sections 24 of the two side walls are folded upward along the fold lines 25. From the top edge part 26 of each outer section 24 extends the inner section 24' of the side wall down into engagement with the bottom 23. The top edges 26 are each provided with a slot 27 for receiving the handle. The outer sections 30 of the end walls are bent up from the bottom 23, along the fold lines 31, and the inner section 30' of each end wall extends from the top edge 32 of the outer section down into engagement with the bottom 23.

The usual style of baskets, made of such foldable material, generally contain single interengaging means on the wall sections to retain the parts in the set-up position, which are inclined to loosen and unlock when the basket is heavily loaded, and those baskets usually require and are therefore equipped with separate securing elements, as cleats, staples or stitches, to hold the foldable parts properly in the set-up position.

With the present invention applicant obviates any need of such separate securing elements, by providing an improved compound interlocking arrangement between the foldable parts, and in the form shown in Fig. 1, this is preferably accomplished by using a compound set of interlocking means between the side walls and the end walls. One set of these interlocking means includes tongues or tabs 33 extending from the lower end portions at the sides of the inner end sections 30', adapted to engage in notches 34 provided at the lower corners of the inner side sections 24', notches 35 being provided on end sections 30', extending from tabs 33 to the top edge 32, to facilitate moving said inner sections in position. The second set of interlocking means includes flaps 37 extending from the ends of the two outer sections 24 of the side walls, one flap being provided with a notch 38 extending from the bottom edge into the flap and the companion flap being provided with a similar notch 38 extending from the top edge into the flap thereby providing a tongue 39 at the end of each flap, beyond each notch 38. These notches and tongues interengage, as best shown in Fig. 4, to interlock and securely hold the end walls and side walls in the set-up position. A short tab 40 extends from each inner section 24' of the side wall, and a tab 40 together with a notched flap 37 extend across the entire end, as indicated in Fig. 4. The inner end section 30' is folded inwardly over the interlocked flaps 37 and short tabs 40, whereafter the tabs 33 are engaged in notches 34, thereby providing another interlocking means between the end walls and the side walls.

The flaps 37 with their interengaged tongues 39 herein provide the main interlocking and retaining means, and the tongues 33 on the folded-over inner end section 30', together with the notches 34, provide the second set of interengaging means, which reinforces and positively holds the other in position, thereby providing double or compound interlocking means for securely and positively holding the basket body in its set-up position. The locking elements are likewise releasable so that the basket may be collapsed for readily stacking or transmitting the unfolded baskets.

The handle 21 is readily attachable to and detachable from the basket, said handle being preferably constructed from a pair of resilient wires which are twisted together at their main intermediate portions, as indicated in the drawings, providing the upper hand-engaged part from which arms 43 diverge downwardly, having prongs 44 extending from the lower ends. The arms 43 are flexed or pressed together to insert the prongs 44 thru the slots 27 on the side walls, so that the arms can be readily snapped into position on the body, and can likewise be readily actuated for removing the handle from the body. The arms with their prongs are also readily moved downwardly between sections 24 and 24' of the side walls, so that they are hidden from view and out of the way, and the upper part of the handle is substantially flush with the top edge 26 of the body, as indicated by the dotted lines in Fig. 7, in order that the baskets may be stacked one upon the other whether filled or empty. Due to the fact that the arms 43 are normally sprung apart, these arms exert frictional engagement with the edges of the slots 27 so as to resist accidental movement of the handle. Due to the fact that the arms incline toward each other at the top, the spring action renders the handle easily depressible because this direction of movement is aided by the spring action of the arms themselves. On the other hand, when the handle is being used to carry the basket, the weight of the basket readily overcomes any tendency of the handle to move down with respect to the basket or the basket to move up with respect to the handle. It will further be noted that the prongs and the arms of the handle will slide in engagement with the inner surfaces of the side walls, whereby the side walls will exert some frictional resistance to their up and down movement. Due to the spring action of the arms 43 resulting from their angle of disposition with respect to the slots 27, there is a tendency for the handle to move inwardly a predetermined distance, whereby the depressing of the handle is more easily effected. After the handle is moved inwardly to an extent which causes the arms 43 to free themselves from engagement with the edges of the slots 27, the remaining portion of the inward movement is effected purely by manual operation against the friction on the inside of the side walls.

The partition means 22 provided for this basket is adapted to be placed between the layers of fruits or vegetables therein to prevent the upper layer from injuring the lower layer, and this partition means is preferably provided with side tongues 46 adapted to engage in slots 47 provided in the inner sections 24' of the side walls, said tongues 46 being covered by the outer wall section 24 and being thereby hidden from view from the outside of the basket. An opening 48 may also be provided in the partition for inserting a finger to remove the partition from the basket. The tongues 46 at the intermediate part of the side are spaced sufficiently apart so as to facilitate the descending of prongs 44 therebetween when the handle is moved to its depressed or inactive position, as indicated by dotted lines in Fig. 7.

Due mainly to the double wall construction and the improved interlocking arrangement, and as indicated in Figs. 10 and 11, the basket is well adapted to be made from single face corrugated material, as well as from multiple face material as indicated in the other disclosed forms.

This basket 50 of the single face material is constructed substantially like the foregoing basket 20, and it similarly comprises the handle 51 with its depending pronged arms 51'. The basket includes the bottom 53 from which the outer sections 54 of the two side walls are bent upward and have the inner sections 54' bent down inwardly from their upper edges to the bottom 53. The top edge 56 of each side wall has a slot 57 therein for receiving the pronged arm 51' of the handle, as in the preceding form. The end walls have their outer sections 60 bent up from the bottom 53, and the inner sections 60' are bent down inwardly from their upper edges to the bottom.

This form also contains the double locking means between the end walls and the side walls, including the locking tongues or tabs 63 extending from the inner end sections 60', adapted to engage in notches 64 in the inner side sections 54'; and notches 65 are likewise provided on end sections 60', extending from tongues 63 to the top. It also includes the second set of interlocking means having flaps 67 on the ends of the outer sections 54 of the side walls, said flaps having the notches 68 therein and the tongues 69 to interengage and securely hold the parts together. It also includes the short flaps or tabs 69' extending from the side wall sections 54' into the end walls; and a tab 69' together with a notched flap 67 extend across the entire end, as indicated in Fig. 10. The inner end section 60' is folded inwardly over the interlocked flaps 67, and the tongues 63 are engaged with notches 64, thus holding the basket securely in its set-up position.

In this form the handle 51 is also readily attachable to and detachable from the basket, and its deflecting pronged arms 51' are readily movable thru slots 57 down between the side sections, in the same manner as in the preceding form.

Figs. 12 to 15 illustrate the improved market basket as containing a modified form of interengaging means in its end walls, differing from the foregoing disclosure.

This basket comprises the basket body 70 formed from a single blank of material, also the handle 71 with its depending pronged arms 71' readily attachable to and removable from the basket body, and the partition 72 is readily insertable in and removable from said body.

The basket body 70 comprises the bottom 73 from which the outer sections 74 of the side walls are turned up, and from the top edges 76 of which depend the inner sections 74' to the bottom 73. Said top edges 76 have a pair of slots 77 which receive the pronged arms 71' of the handle, being readily insertable and removable, and also being readily depressible to place the top of the handle flush with the top edges 76.

In this form of basket the end walls each comprise one end section 80 bent up from the bottom 73 and provided with a pair of tongues 83 at its sides engaging in a pair of notches 84 provided on the adjacent ends of the inner sections 74' of the side walls. A flap 87 extends from each end of the outer side wall section 74 and is provided with a notch 88 forming a tongue 89, one extending upward and the other downward to interengage, as shown in the drawings, and these provide the second section of this end wall and the second interengaging means thereof to interlock the parts securely in position. These flaps 87 are preferably placed outward of section 80, and an extension or auxiliary flap 90 on the upper end of each flap 87 is folded inwardly over the top edge of section 80, substantially as shown in the drawings, thus providing a strengthened upper edge on the end wall and also providing a supporting ledge whereon a cover or top member can rest whenever it may be used herein.

The partition 72 has side tongues 91 adapted to engage in slots 92 provided in the inner sections 74' of the side walls, similarly as in the above described construction, so as to be readily insertable and removable, and to be hidden from view by the outer side sections 74.

Figs. 16 to 19 illustrate my improved basket as comprising a further modified form of interengaging means in its end walls. This basket also comprises the basket body 100 made from a single blank of material, also the removable handle 101 with its depending pronged arms 101', and the removable partition 102, like in the above disclosed forms.

The body 100 comprises the bottom 103 from which the outer sections 104 of the side walls arise, and from the top edge 106 of each section the inner section 104' depends to the bottom 103. Said top edges 106 have slots 107 therein which receive the pronged arms 101' of the handle, to be readily insertable and removable, and also to be depressed onto the side sections, as explained above.

In this form the end wall comprises an end section 110 bent up from the bottom 103, and provided with a slot 111 therein. A flap 117 extends from each end of each outer side wall section 104, and has a notch 118 cut therein forming a depending tongue 119, a pair of tongues of the two adjacent flaps being engaged in the slot 111 of the associated end section 110, thereby providing an outer end section and one interengaging or interlocking means of this end wall. A pair of extensions or auxiliary flaps 120 extend from the top of the two flaps 117 and are bent over section 110 inwardly down to bottom 103, each having a tongue 121 extending laterally into a notch 122 provided on the inner section 104' of the side wall. These two extensions thus provide the second interengaging means and an additional and inner wall section of this end wall.

The partition 102 has side tongues 123 adapted to engage in slots 124 provided in the inner side sections 104', concealed by the outer sections 104, and adapted to be readily inserted and removed, as in the other forms.

This arrangement and form, like all of the preceding ones, comprises a wall section with secure interlocking means and a second wall section with interengaging means inward thereof to reinforce and secure the first one, thus providing double interengaging means for holding the wall sections securely in the set-up position; and it produces a strong market basket with its double side walls and end walls.

The novel arrangement of the handle in conjunction with the double wall sections of the basket provides for readily depressing the arms and prongs between said sections, so as to place the handle top flush with the top of the basket, as well as to raise it for carrying the basket; and the prongs are at all times embedded between said sections and covered thereby, no stapling or cleating of the handle being necessary, thus preventing bruising the contents or scratching a person; while the operative connection between the handle and the basket is not weakened by this arrangement, nor the utility of the handle for carrying the basket.

I claim:

1. A basket comprising walls including two opposite ones having inner and outer sections provided with slots in the inner sections, and partition means having tongues insertable in said slots, adapted to separate and protect a lower layer of articles from the upper layer, said tongues being covered and hidden from view by the outer wall sections.

2. A basket comprising a bottom and double side and end walls, said side walls including an outer section turned up from the bottom and having an inner section turned down therefrom and engaging the bottom, there being slots provided in the inner sections of the side walls, and a partition having side tongues engaging in said slots, adapted to separate the layers of articles in the basket, said tongues and partitions being covered and concealed by the outer wall sections, thereby providing a smooth interior for the articles and also a neat exterior.

3. A basket comprising a bottom and side and end walls formed of a single substantially rectangular blank of material, the side walls each including a section turned up from the bottom and another section turned down from said section to the bottom, the end walls being turned up from the bottom, interengaging means on the side and end walls, including interengaging notch and tongue means on the inner sections of the side walls and on the end walls, and flaps on the outer sections of the side walls including interengaging notch and tongue means joined across the end of the basket, thereby providing double end walls and double interlocking means.

4. A basket comprising a bottom and integral walls arising therefrom including a pair of opposite walls having each an inner and an outer section joined at the top and provided with a slot in the closed top edge, and a handle including a substantially straight upper part having a pair of arm means depending from its ends and each arm means comprising a pair of spring members each having a prong thereon extending in opposite directions therefrom, the arm means extending thru the slots and together with the prongs being depressible between the wall sections, so as to place the upper part of the handle down onto the top edge of the basket, said spring members of each of said arm means being held under initial compression when said handle is in elevated position.

5. The combination of a basket having a bottom, end walls and side walls, in which the side walls comprise an outer wall section extending upwardly from said bottom, a relatively narrow top edge panel and an inner wall section spaced from said outer wall section and extending downwardly to said bottom from the inner edge of said panel and in which said top edge panel is slotted adjacent the mid-section of said side wall to provide handle-receiving slots, and a handle comprising a cross gripping member and depending arms at each end thereof, each arm consisting of a pair of diverging spring members each having an angularly disposed prong at its lower end, said diverging spring members being held in said slots, respectively, under initial compression with said prongs engaging the undersides of said top edge panels when said handle is in elevated position, and being adapted to be moved downwardly in the space between said wall sections.

6. The combination of a basket having a bottom, end walls and side walls, in which the side walls comprise an outer wall section extending upwardly from said bottom, a relatively narrow top edge panel and an inner wall section spaced from said outer wall section and extending downwardly to said bottom from the inner edge of said panel and in which said top edge panel is slotted adjacent the mid-section of said side wall to provide handle-receiving slots, and a handle comprising a cross gripping member and depending arms at each end thereof, each arm consisting of a pair of diverging spring members each having an angularly disposed prong at its lower end, said diverging spring members being held in said slots, respectively, under initial compression with said prongs engaging the undersides of said top edge panels when said handle is in elevated position, and being adapted to be moved downwardly in the space between said wall sections, said arms and prongs having frictional engagement with a portion of the inside surface of said side walls.

FRANK ROKOL.